Jan. 13, 1959

A. HAHNEL 2,868,977

CRYSTAL CONTROLLED SPECTRUM GENERATOR

Filed Dec. 21, 1954

INVENTOR.
ALWIN HAHNEL

BY

Harry M. Saragovitz
ATTORNEY 2,868,977

CRYSTAL CONTROLLED SPECTRUM GENERATOR

Alwin Hahnel, Little Silver, N. J., assignor to the United States of America as represented by the Secretary of the Army Application December 21, 1954, Serial No. 476,860

5 Claims. (Cl. 250—36)

(Granted under Title 35, U. S. Code (1952), sec. 266)

The invention described herein may be manufactured and used by or for the Government for governmental purposes, without the payment of any royalty thereon.

This invention relates to crystal stabilized, controlled oscillators and more particularly to oscillators of the type which employ the simultaneous excitation of a plurality of different frequency oscillations in a single tube circuit.

It is an object of this invention to provide a simple circuit for the generation of a frequency spectrum of high order harmonics which displays a ruler-like amplitude distribution.

It is another object of this invention to provide a simple circuit for the generation of a frequency spectrum of high order harmonics which permits the change from a widely spaced output spectrum to one which has numerous interpolating frequencies equally spaced, which change is accomplished without the switching of any tuned circuits or the switching of any crystal controlled circuits.

Still another object of this invention is to provide a circuit in which there is established automatically a fixed phase relationship between two or more oscillations of widely spaced frequencies.

Reference is made to my co-pending U. S. patent application, Serial No. 476,859, title, Spectrum Generator, filed concurrently herewith of which the present application is an improvement. The spectrum generator disclosed herein may be found useful in the frequency controlled portion of multi-channel equipment where it is desirable to utilize the minimum number of crystals and tubes or where miniaturization is important. Other possible applications of this invention include a wide range frequency meter and frequency control systems of various types.

Figure 1:
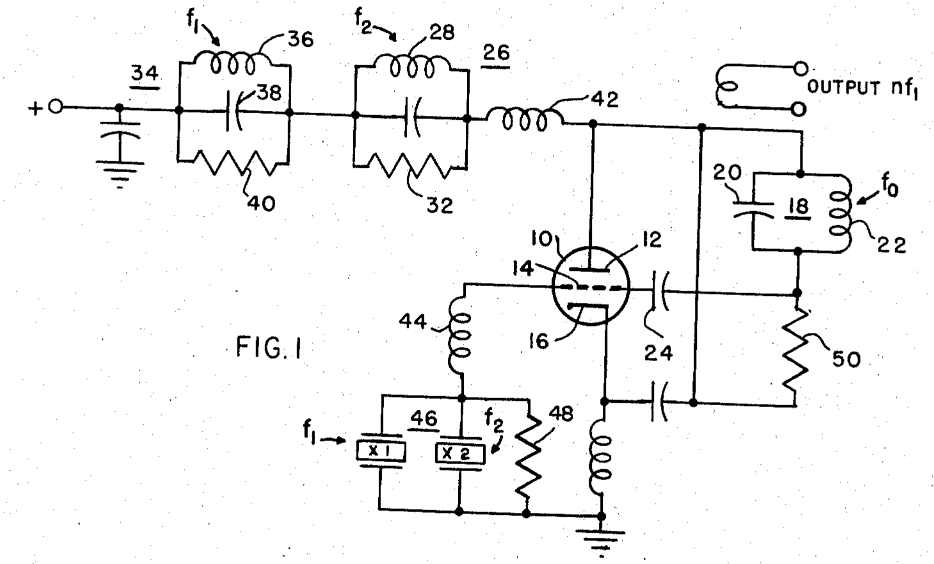
Figure 2:
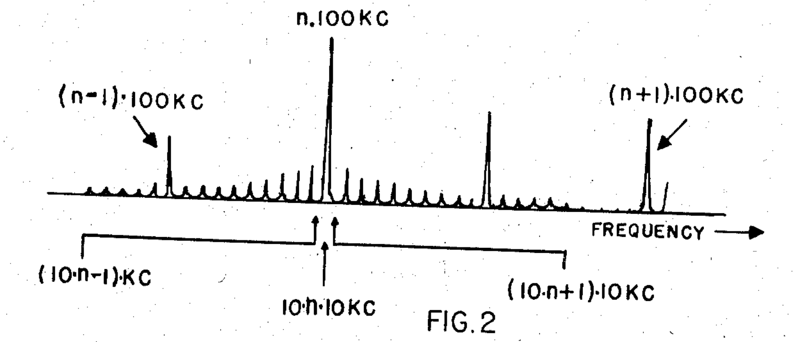
Figure 3:
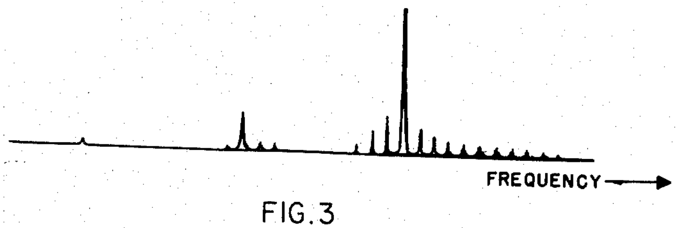

The above and other objects and advantages will become apparent when the following specification is read in conjunction with the drawings in which Figure 1 is a schematic diagram of a circuit embodying this invention; Figure 2 illustrates the output spectrum of a circuit embodying this invention in which each tenth harmonic is stronger than the intermediate harmonic; Figure 3 illustrates the output spectrum of a circuit embodying this invention in which is shown a narrower envelope bandwidth.

Referring now to Figure 1, the oscillator circuit illustrated is designed to permit simultaneous excitation of three separate oscillations at frequencies designated $f_1$, $f_2$ and $f_0$. The circuit in general comprises an oscillator tube 10 having an anode 12, a control grid 14, and a cathode 16. In the plate-grid circuit of tube 10 there is provided a tank circuit 18 resonant at the frequency $f_0$, comprising a capacitor 20, and an inductance 22 connected in parallel. A blocking condenser 24 is interposed between the grid 14 and tank circuit 18 of the oscillator tube 10.

The next lower frequency to be generated by this oscillator designated $f_2$, is accomplished by means of a resonant network 26 comprising an inductance 28, a capacitor 30 and a resistance 32 in parallel arrangement, and crystal $x_2$. The resonant network 26 is interposed in the anode circuit of tube 10 between the positive high voltage supply and the anode 12.

To generate the lowest frequency of the oscillations in the circuit, designated $f_1$, there is provided a crystal $x_1$ and a resonant network 34 comprising an inductance 36, a capacitor 38 and a resistance 40 in parallel arrangement similar to that of the resonant network 26. The resonant network 34 is in series with the resonant network 26 in the anode circuit of tube 10 between the positive side of the high voltage supply and the anode 12.

In order that each of the resonant networks 18, 26, and 34 shall be free from interference by the others there is provided an isolation choke 42 between the anode 12 and the network 26, and an isolation choke 44 between the grid 14 and the crystal network to be described below. Capacitor 24 is selected to be of such value as to permit sustained oscillations at the frequency $f_0$.

In the circuit of the grid 14 there is provided a parallel crystal network designated generally by the reference numeral 46 which includes a crystal $x_1$ arranged to oscillate at a frequency $f_1$ which is equal to the resonant frequency $f_1$ of the network 34. A second crystal $x_2$ arranged to oscillate at a frequency $f_2$ which is equal to the resonant frequency $f_2$ of the network 26, is in parallel with the crystal $x_1$, as well as a resistance 48.

The highest frequency is generated in the resonant tank circuit 18. The next highest frequency, $f_2$, is generated by utilizing the network 26 in the anode circuit of tube 10 and the network including crystal $x_2$, inductance 44 and resistance 48 in the grid circuit of tube 10. The lowest frequency $f_1$ is generated by the resonant network 34 in conjunction with the crystal network 46 including the crystal $x_1$, resistance 48 and inductance 44.

A resistor 50 is connected across the tank circuit 18 to lower the Q of that portion of the entire circuit which generates the frequency $f_0$. A lowering of the value of resistor 50 results in a broadening of the average envelope of the output spectrum. An increase in the value of the resistor 50 will change the output spectrum as illustrated by Figure 2 to the one illustrated in Figure 3.

The resistors 32 and 40 permit an adjustment of the amplitude of the oscillations at the frequencies $f_1$ and $f_2$.

As seen from Figure 1, the frequency $f_1$ is selected to be a subharmonic of the frequency $f_2$. The ratio of $f_1$ and $f_2$ should be in the order of 10 or larger to avoid undesirable interactions between the plate circuits which are resonant at $f_1$ and $f_2$, or between the two crystals $x_1$ and $x_2$. The choice of the value of the resistors 32 and 40 determines the amplitude ratio of the $f_2$ harmonics to that of the $f_1$ harmonics in the case where the $f_2$ harmonics are not identical to the $f_1$ harmonics. It has been found that a very slight amplitude modulation of $f_1$ results in a very strong emphasis of each integral multiple of $f_2$. At equal amplitudes of the $f_2$ and $f_1$ oscillations the ratio of the amplitudes of the $f_2$ harmonics to the adjacent $f_1$ harmonics is considerably reduced. The choice of the oscillation amplitudes and therefore also the amplitude ratio is not completely arbitrary, as it is desirable to generate simultaneously both crystal oscillations in order to obtain a pulling effect resulting in the interlocking of the two crystal oscillations $f_1$ and $f_2$ even if the crystal frequency $f_2$ deviates slightly from the value which is an exact integral multiple of $f_1$.

In operation, that portion of the circuit that generates the oscillations at the frequency $f_0$ is keyed such that the phase of these oscillations is periodic at the frequencies $f_1$ and $f_2$. These keying voltages are generated in the same tube simultaneously with the $f_0$ oscillation. To obtain a crystal controlled frequency spectrum in the vicinity of a frequency F, the tank circuit 18 should be tuned to the center of the desired frequency range. The keying voltages at the frequencies $f_1$ and $f_2$ bias the grid 14 such that the $f_0$ oscillator's regeneration is restricted to clearly defined periods. The repetition interval given by the keying frequency $f_2$ is thus divided into a regenerative and a degenerative period. During the regenerative period, the $f_0$ oscillations build up exponentially until an equilibrium amplitude is reached and then decay in an exponential manner. The phase of the $f_0$ oscillations is essentially periodic at the frequencies $f_1$ and $f_2$, otherwise the output of this spectrum generator would be that of a carrier that is amplitude modulated at the repetition frequency $f_1$. In the correct mode of operation, i. e., when due to the large harmonic content of the keying voltage, the $f_0$ oscillations are controlled at the time when the next regenerative period starts. The output of this spectrum generator consists only of harmonics of the frequency $f_1$. Oscillations at the frequency $f_0$ do not appear in the output if they are not integral multiples of $f_1$.

Thus, this oscillator circuit not only permits the simultaneous excitation of three separate oscillator frequencies $f_1$, $f_2$ and $f_0$ but also the quenching of the higher frequency oscillations $f_0$ at the rate given by the higher ($f_2$) of the simultaneously generated oscillations $f_1$ and $f_2$ such that the phase of the $f_0$ oscillations is periodic at the frequency $f_2$. The output is a spectrum of the exact harmonics of $f_1$ and $f_2$ since $f_1$ is essentially selected to be a subharmonic of $f_2$.

Having thus described my invention, what is claimed is:

1. A frequency spectrum generator comprising an oscillator having a vacuum tube incorporating an anode, a grid and a cathode; a first tank circuit tuned to a first resonant frequency forming a portion of the anode circuit of said vacuum tube and determining the operating frequency thereof; and an output means coupled to said first tank circuit; and a keying means associated with said oscillator comprising a second and third tank circuit tuned to a second and third frequency connected in series and forming another portion of the anode circuit of said vacuum tube, the second frequency being substantially a sub-harmonic of said first frequency and the third frequency being a sub-harmonic of said second frequency; and a pair of crystals and a resistance connected in parallel with each other and forming an input circuit for said vacuum tube, the crystals respectively having a frequency response equal to said second and third frequencies, said keying means operating to produce alternate regenerative and degenerative periods in the operations of said oscillator whereby the output of said oscillator contains a frequency spectrum in which the harmonics of said second and third frequencies are accentuated and all other harmonics are attenuated.

2. A frequency spectrum generator as defined in claim 1 further including a resistance shunting each of said tank circuits, the resistance shunting said first tank circuit being chosen to control the breadth of the envelope of the output spectrum, the resistance shunting the second and third tank circuit being chosen to obtain optimum amplitude of oscillations therein, whereby the output spectrum presents a ruler-like amplitude distribution.

3. A frequency generator in accordance with claim 2 wherein there is further included a choke coil between the first and second tank circuits on the one hand and the anode and the cathode on the other hand and a choke coil between the crystals and the grid, whereby energy of said first frequency is prevented from access to said second and third tank circuits and to said crystals.

4. A frequency spectrum generator comprising an oscillator operable to generate a first frequency and means associated therewith comprising a pair of crystals connected to the input of said oscillator having frequency responses respectively equal to a second and third frequency, the second frequency being substantially a sub-harmonic of said first frequency and said third frequency being a sub-harmonic of the second frequency, a first and second tank circuit connected in series in the output of said oscillator tuned respectively to said second and third frequencies, resistances shunting each of said tank circuits having resistance values selected to adjust the amplitudes of the oscillations in each tank circuit and choke coils connected between the tank circuits and crystals on the one hand and the oscillator on the other hand to isolate the oscillator frequencies therefrom, whereby said oscillator will have an output with a frequency spectrum presenting a ruler-like amplitude distribution of the harmonics of said second and third frequencies.

5. A frequency spectrum generator comprising an oscillator having an input and an output circuit and operable at a first frequency, means connected in the output and the input circuits of said oscillator to simultaneously cause the generation of a second and third frequency in said oscillator, the second frequency being substantially a sub-harmonic of said first frequency and the third frequency being a sub-harmonic of said second frequency and means associated with said last named means for determining the relative amplitudes of the energy of said second and third frequencies whereby the output of said oscillator will contain harmonics of said second and third frequencies having a ruler-like amplitude distribution.

References Cited in the file of this patent

UNITED STATES PATENTS

| | | |
|---|---|---|
| 1,446,752 | Kendall | Feb. 7, 1923 |
| 2,013,806 | Osnos | Sept. 10, 1935 |
| 2,389,004 | Schroeder | Nov. 13, 1945 |
| 2,721,264 | Selz et al. | Oct. 18, 1955 |
| 2,745,963 | Hahnel | May 15, 1956 |

FOREIGN PATENTS

| | | |
|---|---|---|
| 896,865 | France | Mar. 6, 1945 |